Oct. 8, 1968  E. H. NATSCHKE ET AL  3,404,759
TWO WAY AUTOMATIC SLACK ADJUSTER
Filed Jan. 19, 1967  5 Sheets-Sheet 1
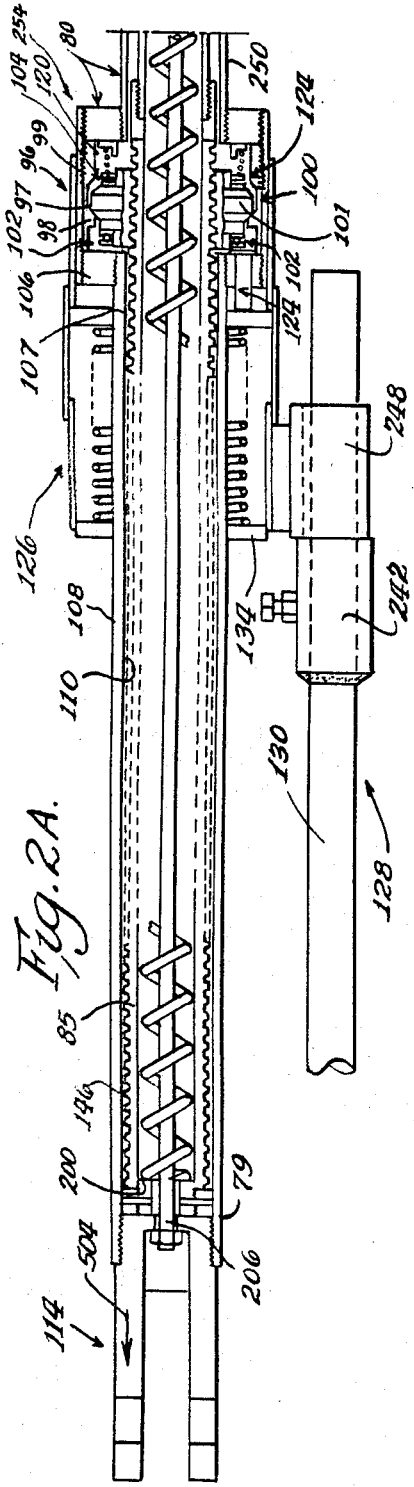
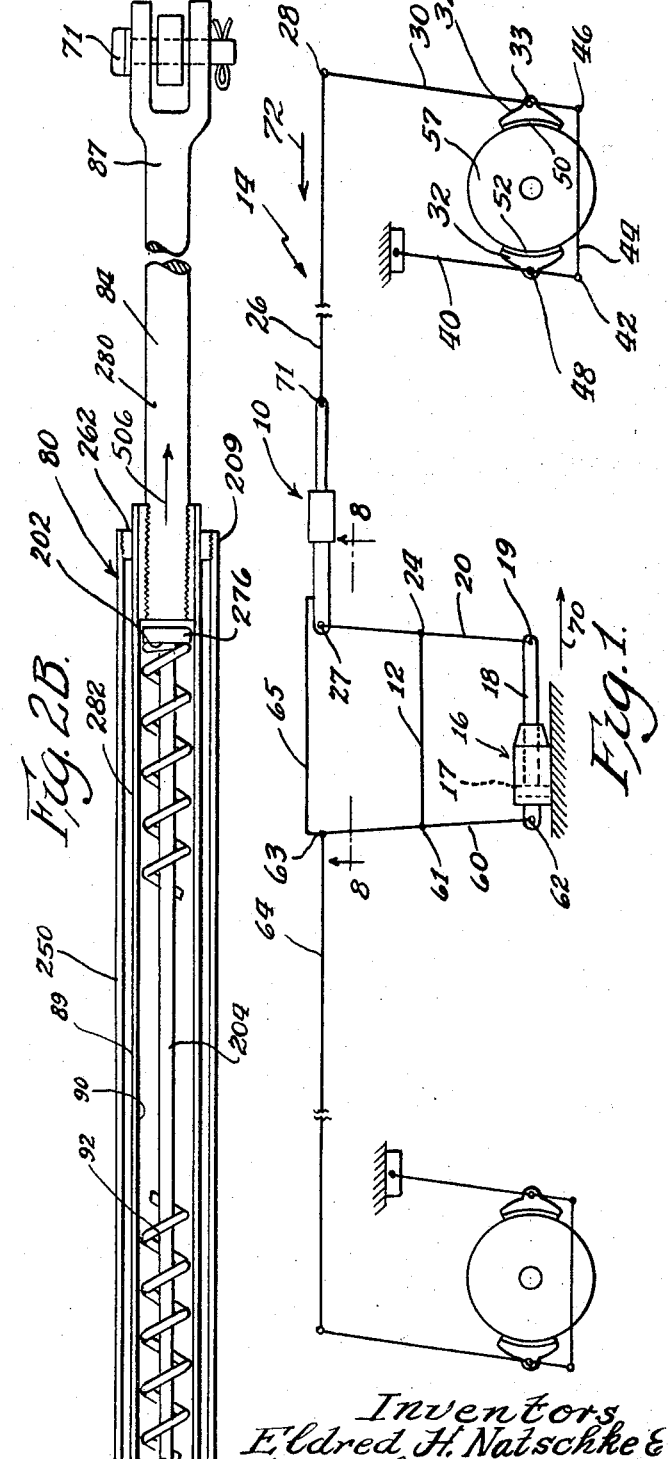
Inventors
Eldred H. Natschke &
Frederick W. St Pierre
By Mann, Brown & McWilliams
Attys.

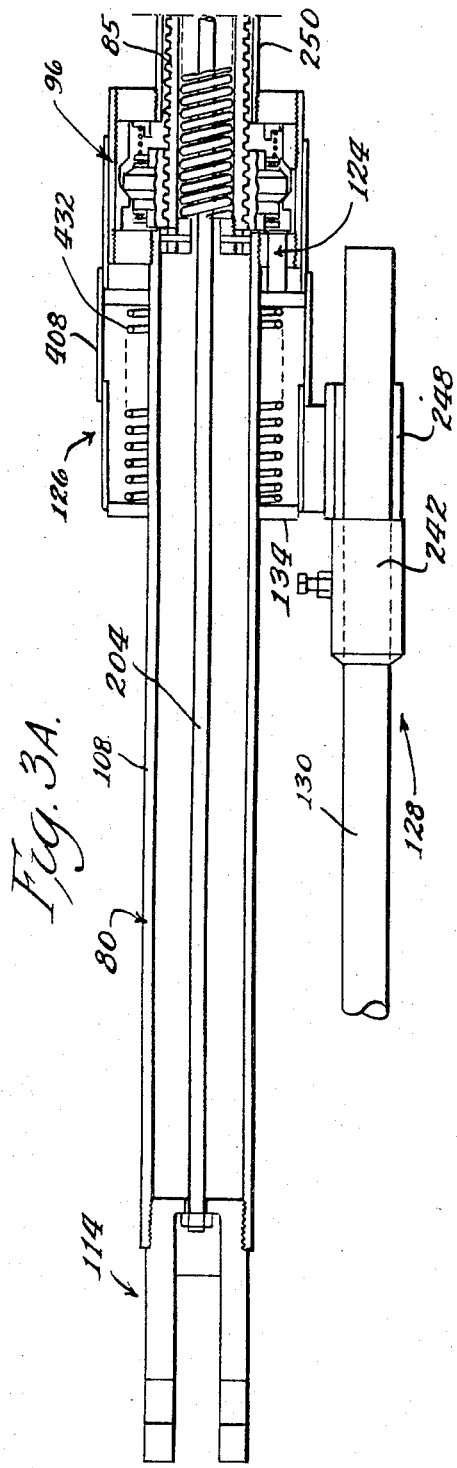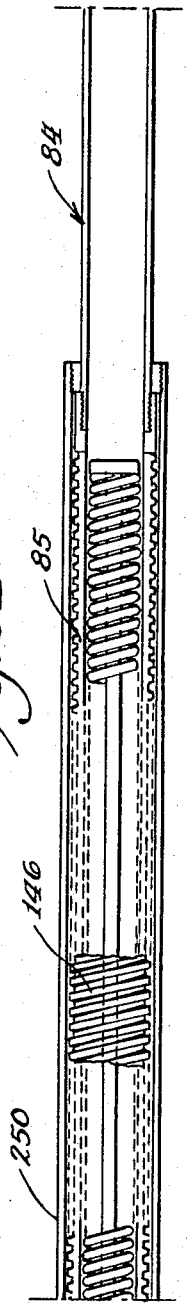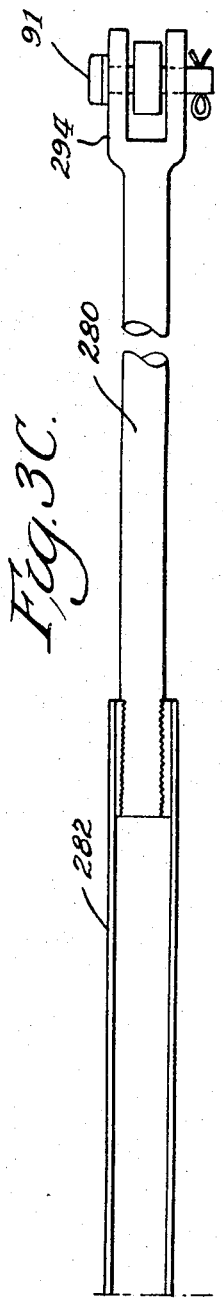

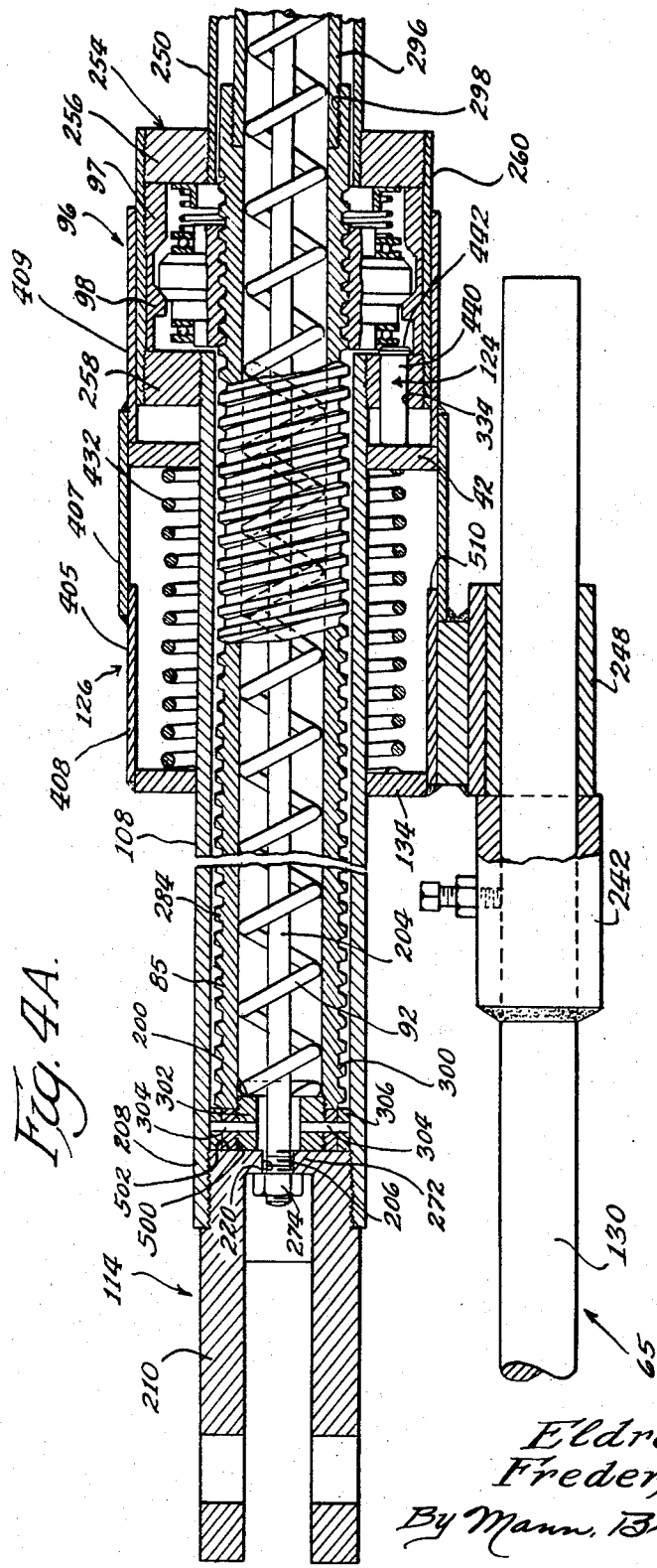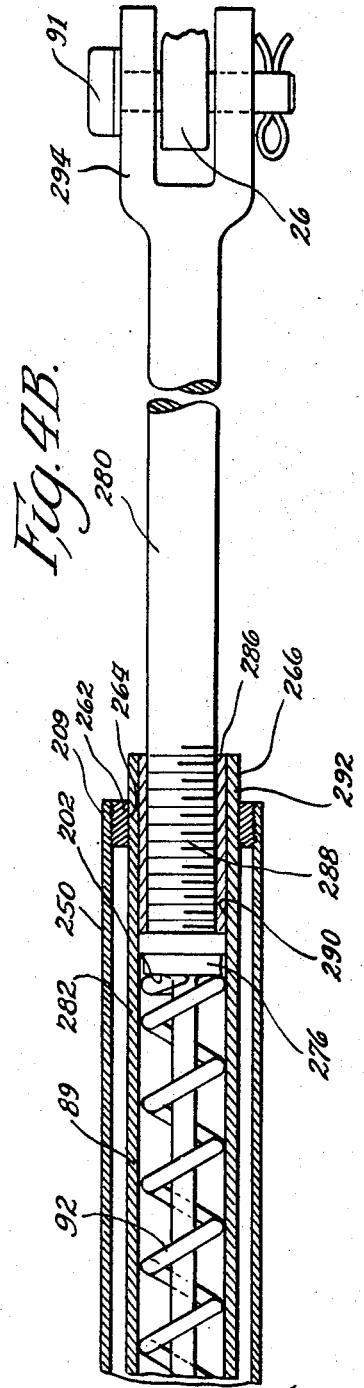

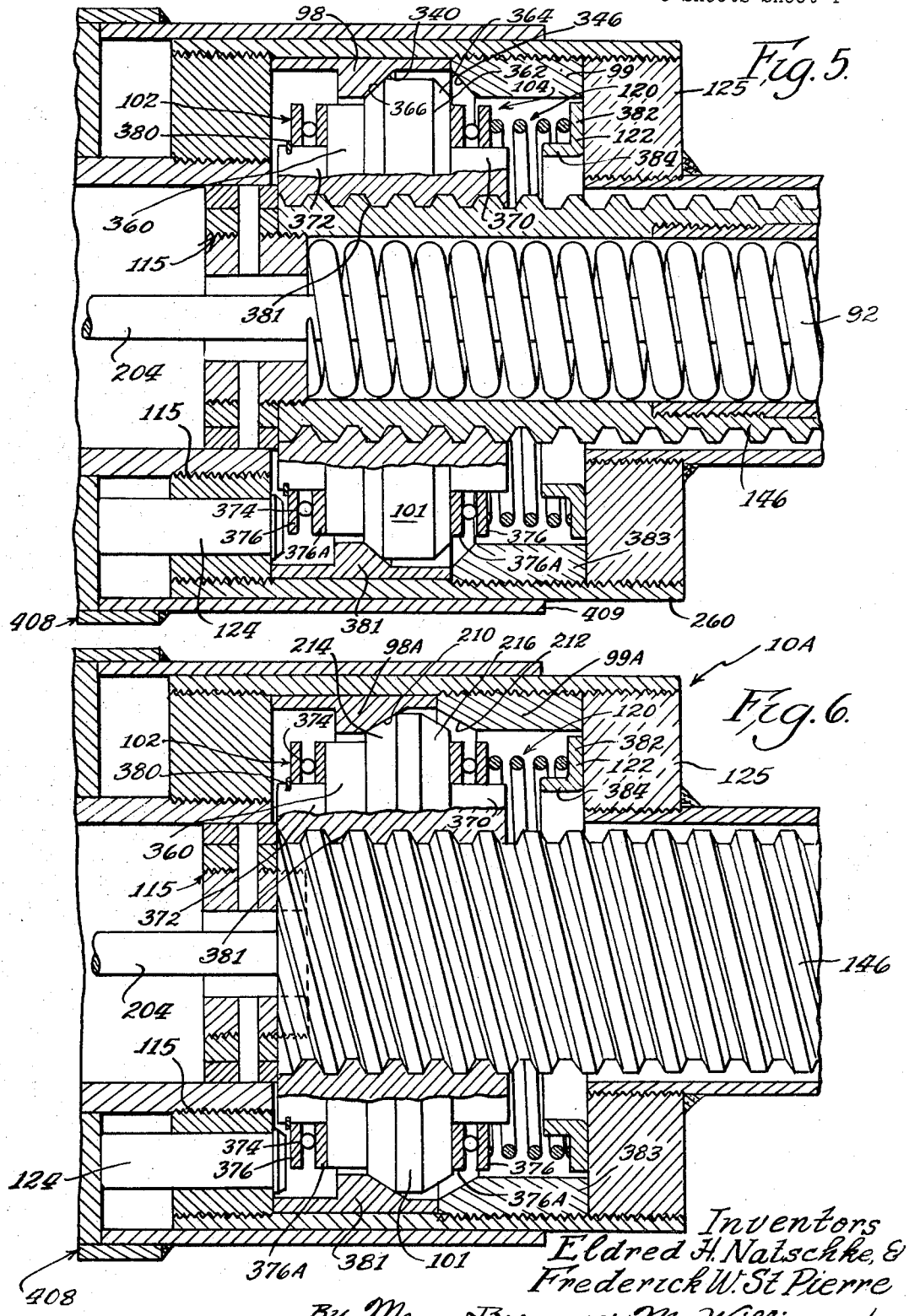

Oct. 8, 1968  E. H. NATSCHKE ETAL  3,404,759
TWO WAY AUTOMATIC SLACK ADJUSTER
Filed Jan. 19, 1967  5 Sheets-Sheet 5
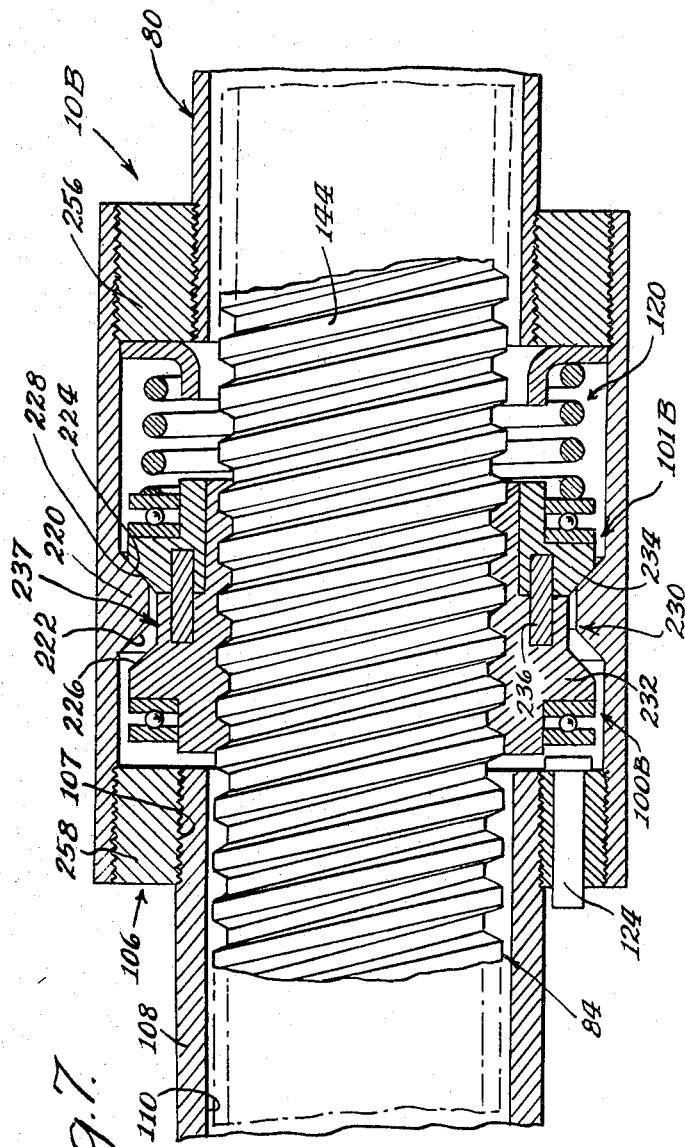
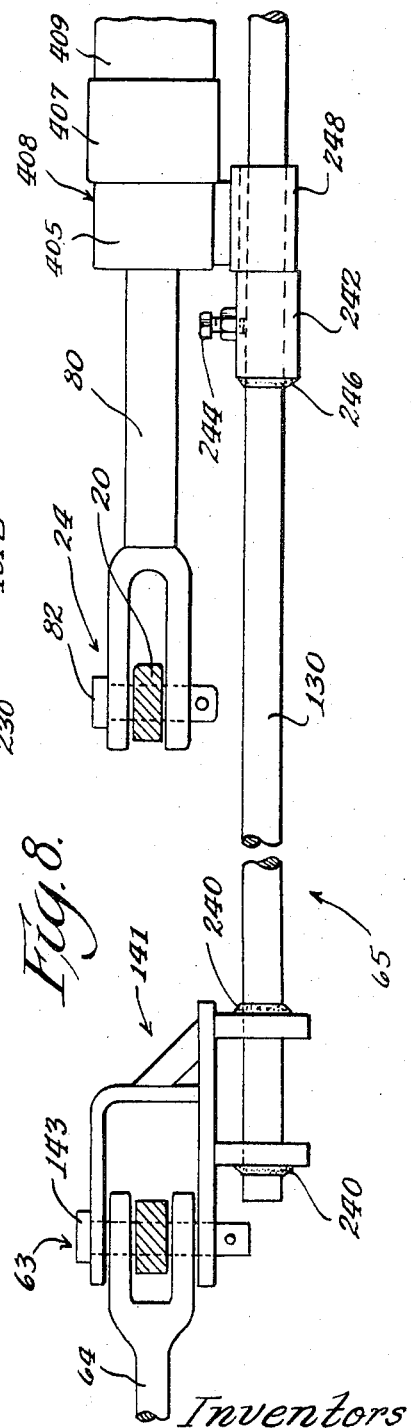
Inventors
Eldred H. Natschke &
Frederick W. St Pierre.
By Mann, Brown & McWilliams
Attys.

United States Patent Office 3,404,759
Patented Oct. 8, 1968

3,404,759
TWO WAY AUTOMATIC SLACK ADJUSTER
Eldred H. Natschke, Kankakee, and Frederick W. St. Pierre, Downers Grove, Ill., assignors to Universal Railway Devices Co., a corporation of Delaware
Filed Jan. 19, 1967, Ser. No. 610,347
8 Claims. (Cl. 188—202)

ABSTRACT OF THE DISCLOSURE

This invention relates to two way automatic slack adjusters, sometimes called brake adjusters, and it is an improvement over that disclosed in Rauglas Patent 3,177,985, granted Apr. 13, 1965. In accordance with the improvements of this application, the brake adjuster is arranged to provide twenty-four inches of travel, and thus is especially adapted for top rod applications, by incorporating the main spring of the unit within the adjuster screw member in such a way that the unit retains the simplicity and operational advantages of the Rauglas adjuster while keeping the adjuster fully extended length down to minimum proportions. In addition, the arrangement of the controlling spin nut end clutch and cooperating clutch surfaces has been improved.

---

Top rod brake adjuster applications require that the adjuster have twice the travel that center rod applications require, and this has made it difficult to provide a brake adjuster that is readily adapted for both types of applications, that will provide the longer travel required for top rod applications, and that still will have reasonable length proportions.

A principal object of this invention is to provide a two way automatic slack adjuster that not only functions truly automatically in providing for both brake rigging slack take up and let out, but also provides for travel on the order of 24 inches between maximum let out and take up positions and yet keeps the maximum extended length within reasonable limitations.

Other important objects of the invention are to provide a brake adjuster arrangement in which the solid length of the main spring forms no part of the extended length dimensioning of the adjuster, to improve and simplify the arrangement of the spin nut assembly, and to provide a brake adjuster arrangement that is economical of manufacture, convenient to install and service, and that is readily adapted for use in both foreign and domestic car makes.

Other objects, uses, and advantages will be obvious or become apparent from a consideration of the following detailed description and the application drawings in which like reference numerals are employed to indicate like parts throughout the several views.

In the drawings:

FIGURE 1 is a diagrammatic largely schematic view illustrating a typical brake rigging arrangement to which the brake adjuster of this invention has been applied in a top rod applicaton;

FIGURES 2A and 2B when considered together comprise a composite longitudinal vertical cross-sectional view taken longitudinally of the illustrated embodiment of this invention, showing the adjuster elements largely in elevation and in the fully contracted position of the adjuster;

FIGURES 3A, 3B and 3C are views similar to that of FIGURES 2A and 2B and illustrate the adjuster in its fully extended position;

FIGURES 4A and 4B are views similar to those of FIGURE 2A but on an enlarged scale and showing the specifics of the brake adjuster spin nut and related slack take up and let out control devices;

FIGURE 5 is a fragmental enlarged longitudinal cross-sectional view through the adjuster illustrating the features of the adjuster spin nut and related components;

FIGURE 6 is a view similar to that of FIGURE 5 but illustrating a modified embodiment in which the spin nut clutch surfaces and those they cooperate with are made on an angle of 30 degrees with respect to the longitudinal axis of the adjuster;

FIGURE 7 is a view similar to that of FIGURE 5 but illustrating a modified spin nut arrangement for the adjuster of FIGURE 5; and FIGURE 8 is a fragmental cross-sectional view substantially along line 8—8 of FIGURE 1, but on an enlarged scale and with parts broken away, illustrating the trigger rod arrangement that controls the operation of the adjuster.

However, it is to be distinctly understood that the specific drawing illustrations provided are supplied primarily to comply with the requirements of the Patent Code, and that the invention may have other embodiments which are intended to be covered by the appended claims.

General description

Referring to FIGURE 1, reference numeral 10 generally indicates a diagrammatically illustrated embodiment of this invention in top rod application as part of an otherwise conventional brake rigging that is generally indicated by reference numeral 14. Specific embodiments of the device 10 are shown in FIGURES 2A–7.

The brake rigging 14 that is illustrated is for single axle trucks and comprises the customary air actuated brake cylinder 16 that is secured to the car in any suitable manner and includes a piston 17 which actuates thrust or piston rod 18 that is pivotally connected as at 19 to a cylinder or live lever 20 which is in turn pivotally connected to a center rod 12 as at 24 and a connecting rod 26 that extends to one of the car trucks, where the rod 26 may be pivotally connected as at 28 to the truck actuating lever 30 that is pivotally connected to one of the brake beams 32 as at 33 and that is pivotally connected to a truck dead lever 40 by a link 44 connected between the two by pivotal connections 42 and 46. The dead lever is connected to the other brake beams 32 as at 48 and the two brake beams at each truck carry the diagrammatically illustrated brake shoes 50 and 52.

In the present instance, the adjuster 10 is applied between the connecting rod 26 and the cylinder live lever 20 with the cylinder live lever 20 being connected to the adjuster at pivotal connection 27 and the adjuster being connected to rod 26 at pivotal connection 71.

The rigging center rod 12 is also pivotally connected as at 61 to a dead lever 60 which is fulcrumed in the illustrated embodiment at a pivotal connection 62 that is part of the housing of brake cylinder 16, with the other end of the dead lever 60 being pivotally connected to the other connecting rod 64 as at 63 which is in turn connected to the truck brake apparatus of the other car truck in a manner similar to that shown at the right hand side of FIGURE 1.

The adjuster 10 is controlled by an operating or trigger rod lever 65 extending between the dead lever pivotal connection to connecting rod 64 and the adjuster in the manner diagrammatically illustrated in FIGURE 8.

As is well known in the art, when a braking of the car equipped with the rigging 14 is to be effected, the brake cylinder 16 is actuated to move the thrust or piston rod to the right of FIGURE 1, or in the direction of the arrow 70, which tends to throw the cylinder lever counterclockwise about the pivotal connection 24 between it and the center rod structure. Likewise, this motion tends to move the connecting rod 26 to the left of FIGURE 1 and in the direction of the arrow 72 to swing the truck levers 30 and 40 in a manner to force the brake shoes 50 and 52 against the diagrammatically illustrated truck wheels 57 of the truck at the right hand end of the car. The connection of the center rod 12 with the dead lever 60 actuates the lever 60, the connecting rod 64 and the truck braking apparatus that the rod 64 is connected to in a similar manner so that the brake shoes at the left hand end of the car are applied to the wheels at that end of the car in a simultaneously similar manner.

The brakes are released when the air is released from the cylinder 16 in a conventional manner with the result that the weight of the break beams and their conventional swinging mounting hangers (not shown) swings them away from the respective wheels 57 which causes the connecting rods 26 and 64, the cylinder lever 20 and the dead lever 60, and the brake cylinder thrust or piston rod 18 to move in directions opposite to those indicated by the arrows 70 and 72.

Regulations applicable to brake operation require that the brake power stroke of the cylinder 16 be between 7 and 9 inches, although brake cylinders are customarily proportioned and applied to the car to accommodate a stroke as high as 12 inches to accommodate extreme con- conditions. New cars when their brake rigging is applied and properly adjusted should provide a brake cylinder stroke of 7 inches assuming that the car trucks have new brake shoes applied thereto.

As is well known in the art, brake shoes tend to wear away during each application of the car brakes, and while the brake shoe attrition is not materially noticeable for each braking operation, it is cumulative and causes an increase in the amount of slack created in the rigging as day to day use of the car proceeds. The result is that each time the car brakes are to be applied, the brake levers must be moved just a little further toward the wheel each time, which means that a slightly increased movement of the connecting rods 26 and 64, and the thrust or piston rod 18 is required each time the brakes are applied.

The general function served by the slack adjuster of this invention is to consistently maintain the stroke of a brake cylinder at the desired 7 inches and to automatically accommodate or effect the rigging slack take up or let out that is involved in providing such results.

The adjuster 10 generally comprises a housing member 80 that is pivotally connected at one end 79 thereof to the cylinder or live lever 20 by a suitable pin 82 (see FIGURE 8) which forms the pivotal connection 24. Housing member 80 receives a rod member 84 which in the form illustrated, and in accordance with this invention, includes an elongate plain tubular section 89 that has connected to it a tubular threaded section 85 (see FIGURES 4 and 5). One end 87 of rod member 84 is connected to connecting rod 26 by pin 91, and the other end 89 is received within housing member 80.

The housing member 80 includes a friction stop clutch assembly of the type disclosed in said Rauglas patent and generally indicated at 96, which includes a pair of annular stop or seat members 98 and 99 that in the form of FIGURES 2–5 are fixed to the housing member 80 in spaced apart relation. Operating in the stop clutch space 97 between the two seats 98 and 99 within the housing 80 and on the threaded section 85 of the rod member 84 is a nut device 100 that in the form illustrated includes nut 101 provided with thrust bearing assemblies 102 and 104 on either side thereof (see FIGURE 4A).

The housing member 80 adjacent the stop clutch assembly 96 defines a transversely extending wall structure 106 provided with a central opening 107 from which extends a tubular extension 108 defining a bore 110 in which the section 85 of the rod member 84 is adapted to be received.

The housing member 80 at the end of its extension 108 is provided with clevis structure 114 adapted in the conventional manner for pivotal connection with the cylinder live lever 20 in the manner already indicated.

The tubular extension 108 of the housing member 80 is made fast to the housing member 80 in any suitable manner as by the screw threading 115 that is indicated in FIGURE 5.

Cooperating with the nut device on one side thereof is a slack pay out or let out spring 120 which is interposed between the thrust bearing assembly 104 and the spring seat 122 that seats on another transverse wall structure 125 of housing 80. On the other side of the nut 101 the thrust bearing assembly 102 is engaged by a plurality of thrust pin members 124 (one of which is shown in FIGURES 2A and 5) slidably mounted in the housing end wall structure 106 and engaged by a resiliently flexible thrust device 126 that forms a part of the slack take up control assembly 128 which is associated with the brake adjuster 10 for purposes of controlling the slack take up and let out functions of the adjuster.

The control assembly 128 in addition to thrust pins 124 and the resiliently flexible thrust assembly 126 includes a connecting rod 130 that forms trigger rod 65 and is keyed to the resilient thrust device disc member 134 that is slidably mounted on the tubular extension 108, while the other end of the rod 130 is provided with a clevis structure 141 for connection to the pin 143 which forms the rigging pivotal connection 63 as shown in FIGURES 1 and 8.

The connection of the connecting rod 130 to pivotal connection 143 introduces a differential motion into the operation of the control assembly 128 which controls the slack take up movements of the nut device 100 during operation of the brake rigging.

The threading 146 of the threaded section of the rod member 84 should be such that when the nut device is free to rotate and is biased by the slack take up control assembly 128 toward the right of FIGURES 2A and 5 (with respect to the rod member 84), nut device 100 will move to the right of FIGURE 2A with respect to the rod member 84, which may be designated the nut slack take up rotational direction.

The pay out spring 120 biases nut device 100 for rotation in the opposite direction, which may be designated the nut slack let out direction.

The operation of the adjuster in general follows the principles described in said Rauglas patent, the disclosure of which is hereby incorporated herein by this reference.

In accordance with this invention, the main spring 92 of the adjuster is mounted entirely within the rod member 84 and is interposed between a spring seat 200 that is made fast to the rod member 84 and a spring seat 202 affixed to a tension rod 204 having its other end 206 made fast to the end 79 of housing member 84 that is secured to the cylinder live lever 20.

Rod 84, and specifically its tubular sections 85 and 89, define a spring chamber 90 that receives the main spring 92. The main spring 92 biases the housing member 80 and the rod member 84 for movement in slack take up direction relative to each other from the extended position of FIGURES 3A–3C to the contracted position of FIGURES 2A and 2B.

The adjuster 10 is readily adapted for center rod application as well as for top rod application, and if center rod application is desired the adjuster may be applied in the manner described in said Rauglas patent, in which case the control assembly 128 of that patent would be substituted for the illustrated control assembly 128.

The adjuster 10 is also adapted for other conventional applications and the embodiment 10A of FIGURE 6 is specifically adapted for truck mounted applications wherein the adjuster is subjected to more severe vibration problems. In this embodiment of the invention, the seat members 98A and 99A define inclined friction seat or clutch surfaces 210 and 212 that respectively cooperate with corresponding clutch surfaces 214 and 216 of the nut device, and as indicated in FIGURE 6, the surfaces 210, 212, 214 and 216 are frusto-conical in configuration and are angled at an angle on the order of 30 degrees with respect to the longitudinal axis of the adjuster, as compared to the approximate 45 degree angle of the corresponding surfaces of the adjuster of FIGURES 2A–5. This decreased angulation with respect to the longitudinal axis of the adjuster has been found to significantly increase the locking action that the respective spring seats 98A and 99A have on the nut device and it is found that this improved locking action is sufficient to overcome any vibration problems of truck mounted adjusters.

In the embodiment 10B of FIGURE 7, the housing member 80C includes a single friction clutch seat structure 220 that is convexly contoured and is provided with opposed surfaces 222 and 224 that cooperate with corresponding clutch surfaces 226 and 228 of a modified nut device 100B which is in the form of a composite nut structure 230 made up of nut components 232 and 234 keyed together by dowel pins 236 and formed to define concavely contoured seat structure 237.

Thus, in the embodiment of FIGURE 7, the engaging clutch surfaces of the nut and housing seat are arranged in an inverse manner from the embodiments of FIGURES 2A–6 while still providing a brake adjuster arrangement that operates in the same manner.

*Specific description*

The brake rigging 14 in which the adjuster 10 is shown incorporated may be of any conventional type and several forms have already been mentioned. The arrangement shown in FIGURE 1 is of the type for which the adjuster 10 is specifically adapted as a top rod application, which is preferred for this invention.

In any event, the cylinder and dead levers as well as the levers and linkage for actuating the brake beams may be mounted and interconnected in any suitable manner to serve the conventional functions of brake rigging. Also, the brake cylinder 16 may be of any conventional type of the general form indicated.

The control or trigger arm 65 in the form shown in FIGURE 8 comprises the connecting rod 130 affixed to clevis structure 141 as by welding at 240. As already indicated, the clevis structure 141 is pivotally secured to pivotal connection 63 by pin 143.

The connecting rod 130 in the form of FIGURE 8 carries a sleeve 242 provided with a set screw 244 for setting the position of sleeve 242 after the adjuster has been mounted in position in the rigging to permit the rigging to be adjusted so that the brake cylinder will have the desired stroke with new brake shoes in place. When this relative position of sleeve 242 with respect to the connecting or trigger rod 130 has been determined, the sleeve 242 is welded in place as at 246.

The rod 130 is slidably received through a sleeve 248 that is fixed with respect to disc member 134 of take up control assembly 128, and extends beyond sleeve 248 a sufficient amount to adequately accommodate all possible positions of sleeve 248 with respect to rod 130.

The housing member 80 in addition to tubular extension 108 comprises elongate tubular member 250, with extension 108 and member 250 being connected together by the housing structure 254 for stop clutch assembly 96. The housing structure 254 (see FIGURE 4A) comprises a pair of annular ring members 256 and 258 that are respectively secured to the adjacent ends of extension 108 and tubular member 250, with the rings 254 and 258 being respectively secured to cylindrical housing member 260. In the form shown, appropriate screw threading interconnects these elements together but, of course, any other suitable securing arrangement may be employed. Ring member 258 forms the previously referred to wall structure 106.

The tubular member 250 at its end 209 has applied thereto an annular ring member 262 (see FIGURE 4B) formed with an annular guiding surface 264 that rides on the exterior surface 266 of the tubular section 89 of rod member 84. The ring 262 may be affixed to the tubular member 250 in any appropirate manner as by the screw threading indicated.

The clevis memebr 114 at the other end of housing 8 is formed with opening 270 in its bight portion 272 for receiving the tension rod 204. Nut 274 holds the tension rod in place against the biasing action of spring 92.

The spring seat 202 at the inner end of rod 204 comprises a disc 276 fixed to the rod 204 in any suitable manner.

The rod member 84 comprises a rod section 280 secured to a tubular member 282 that forms section 89 which is in turn secured to an externally threaded tubular member 284 that forms section 85. Rod section 280 is secured to the tubular member 282 in the form illustrated by means of a sleeve 286 (see FIGURE 4B) threaded on its end 288 with the sleeve 286 being externally threaded for cooperation with internal threading 290 of the end portion 292 of tubular member 282.

Rod section 280 at its other end is formed with a conventional clevis structure 294 to connect the adjuster 10 to connecting rod 26 as by employing the pin 91.

The tubular member 282 at its end 296 is screw threadedly received within counter bore 298 of tubular threaded member 284.

The threaded member 284 at its end 300 threadedly receives a sleeve member 302 which forms the spring seat 200 and has keyed thereto by pins 304 a bronze bearing sleeve 306.

The nut device 100 comprises nut 101 in the form of a body 360 (see FIGURE 5) formed with an annular flange or rim portion 362 shaped to define the angled friction surfaces 364 and 366 that are to engage respectively with the friction surfaces 346 and 340 of the housing member. The nut body 360 defines on each side thereof collar portions 370 and 372 on which the thrust bearing assemblies 102 and 104 are respectively mounted. These thrust bearing assemblies may be of any conventional type that includes a series of rolling members 374 applied between a pair of race members 376 and 376A. These assemblies are diagrammatically illustrated but it should be understood that in each thrust bearing assembly the races 376 must be rotatably mounted with respect to the races 376A, and the nut 362 must be rotatably mounted with respect to the races 376. In the illustrated arrangement, the thrust bearing assembly 102 is secured in place by a suitable lock ring device 380 while in the case of thrust bearing assembly 104 the pay out spring 120 holds it in place.

The nut 101 is bored and internally threaded as at 381 for screw threading engagement with the threading 146 of rod member 84.

Clutch seats 98 and 99 comprise annular members 381 and 383, with member 383 being threadedly received in member 260 and holding member 381 in place.

The spring seat 122 of pay out spring 120 is shown in the form of a disc member 382 that is shaped to define a laterally extending sleeve portion 384 for purposes of properly locating the pay out spring 120. Spring 120 may be of any suitable form of compression spring applied between the disc member 382 and thrust bearing assembly 104.

The disc 134 of thrust device 126 has affixed thereto a cylindrical housing sleeve 408 (see FIGURE 4A) which is composed of welded together tubular segments 405, 407 and 409, with the segment 409 slidably engaging the external surface of member 260 of housing member 84. Thus, the housing sleeve 408 completely protects the resiliently flexible thrust device or spring assembly 126.

In the form illustrated the sleeve 248 of slack take up control assembly 128 is affixed as by welding to housing sleeve 408.

The thrust device 126 comprises compression spring 432 received between the disc member 134 and a sliding disc member 426 that in turn engages the pins 124 that are slidably mounted in disc 258 of housing 84. Pins 124 are positioned for engagement with the bearing assembly 102 and comprises suitable pin members 440 mounted for free shifting movement in the openings 334 formed in the disc member 258. The pin members 440 may be provided with suitable head portions 442.

The embodiment 10A is the same as 10 except for the provision of the reduced angulation of the friction clutch surfaces of the nut and housing member that has already been described.

In the embodiment 10B of FIGURE 7, the nut device 100B comprises the composite nut structure 101B that has already been described. The remainder of the parts are similar or identical to corresponding parts already described as indicated by corresponding reference numerals.

*Mode of operation*

The adjuster 10 as supplied for application to a car ordinarily will be in its fully contracted position (see FIGURES 2A and 2B) under the action of spring 92, which will dispose the terminal portion 500 of the rod member 84 against the abutment surface 502 of the clevis 114 which forms a part of housing member 80, and thus the rod member 84 will be withdrawn to its full extent inside the housing member 80.

In this condition the brake adjuster 10 is applied to the brake rigging 14 and the adjuster control assembly 128 is appropriately associated with the dead lever 60 in the manner indicated in FIGURE 8. The positioning and orienting of the various parts of the brake adjuster control assembly 128 are arranged in accordance with the slack take up functions of the adjuster that are about to be described, and in this connection, the movement positioning and length of the trigger rod 130 should be such that the slack take up control assembly 128 applies a bias to the nut device 100 through the pins 124 to the right of FIGURE 2A at approximately the same time during the power stroke of the brake cylinder that the brake shoes contact the car wheels 57 (assuming that all brake shoes are new and are in place).

After the adjuster 10 has been applied in its operating position in substantially the manner indicated, and sleeve 242 has been fixed in place with respect to trigger rod 130, the reaction of the high strength compression spring 92 tends to hold the nut device against seat member 98 of stop clutch assembly 96 and thereby prevent any extension or contraction of the adjuster.

When the brakes are initially set or applied by activating the brake cylinders 16 in the usual manner, the brake rigging goes under tension and the rod member 84 and housing member 80 tend to move with respect to each other in the relative directions that tend to withdraw the rod member 84 from within the housing member 80 and compress the main spring 92 (see arrow 504 and 506 of FIGURE 2A). This action continues until the strength of the spring 92 is overcome to the extent that the nut device 100, which is carried by the rod member 84, becomes separated from its stop seat member 98 and starts to move in the direction of stop seat member 99.

Since it has been assumed that the brake adjuster 10A has been applied to a car brake rigging under operating conditions wherein all shoes are in place and are new, and since it has been assumed that the adjuster has been applied to the rigging 14 in its fully contracted relation, there will be insufficient slack in the rigging to permit the required seven inch brake cylinder stroke.

However, the pay out spring 120, once the power stroke has proceeded to the point where nut 101 is freed from seat 98, applies a bias to nut device 100 tending to turn the nut device 100 in its slack let out direction. Under these conditions, the differential motion that is applied to the slack take up control assembly 128 during the initial power stroke means that the thrust rod sleeve 242 will be short of its normal position with respect to housing member 84 and control rod sleeve 242, with the result that the nut device 100 will turn in its slack let out direction until the parts are positioned so that the nut engages thrust pins 124 and through them presses assembly 126 against the disc 134 and sleeve 248 abuts sleeve 242. When this point has been reached, the adjuster will be set to provide a brake cylinder stroke of 7 inches and the rod member 84 will be extended its maximum amount from housing member 80.

The initial brake power stroke is completed by the nut device 100 being drawn against the stop seat member 99 so that full brake cylinder thrust forces are applied through the brake adjuster in the usual manner for top rod applications.

Thereafter, the normal operation of the brake adjuster will be as follows: The usual operating position of the slack adjuster parts will be substantially as indicated in the showing of FIGURE 5 wherein the nut device 100 is drawn against the stop seat member 98 by the action of compression spring 92.

When the brakes are applied, the rod member and the housing member move in the respective directions indicated by the arrows 504 and 506 of FIGURES 2A and 2B to compress the spring 92 and move the nut device 100 in the direction of stop seat member 99. In the meantime, the differential motion of the slack take up control assembly 128 that is provided by trigger rod 130 moves the disc 134, spring assembly 126, and thrust pins 124 to the right of FIGURE 5 with respect to the housing member 80, with the nut device 100 being freed from seat member 98 about the time that the brake shoes engage the wheels 57.

Under the indicated conditions and the proportioning of parts in the operating linkages contemplated by this invention, there ordinarily will be little or no rotation of nut device 100 as it moves between the seat members 98 and 99 during the power stroke, and after the nut device 100 engages the seat 99, the brake stroke continues to completion to apply the full thrust of the brake through the rigging brake shoes. In the meantime, movement of the trigger lever 130 continues to the right of FIGURE 8 which effects a further differential movement of slack take up control assembly 126 with respect to housing member 80 and rod member 84 that in turn effects the resilient contraction of spring assembly 126 due to the fact that the nut device 100 cannot move with respect to the rod member 84 while it remains in contact with the stop seat member 99.

After the power stroke is completed, the air is released from the brake cylinders 16 and tension in the rigging disappears, thereby permitting the brake beams to swing somewhat away from the wheels 57. Simultaneously, the main spring 92 operates to withdraw the rod member 84 into housing member 80 to the extent that the nut device 100 is separated from stop seat member 99, whereupon the bias that is applied to the nut device by the compression of the spring assembly 126 turns the nut 101 (against the bias of pay out spring 120) in the slack take up direction that corresponds in amount to the brake shoe wear sensed by the operation of trigger rod 130. The spring 92 continues to act to draw the nut device against seat member 98 of stop clutch assembly 96, and when this has been effected, the brake adjuster apparatus is set at its operating position to handle the next brake stroke application.

During each subsequent brake stroke operation, the brake adjuster functions to take up slack in substantially the same manner so long as no brake shoes are lost.

This continues until brake shoe wear has proceeded to the point where replacement of the brake shoes is required, and as part of the procedure to perform this operation, the brake beams are pried away from the car wheels to provide enough working space to fit the shoes in place on the brake beams. The normal slack in the rigging plus the spacing of the seat members 98 and 99 of the brake adjuster accommodate the necessary brake beam movement to accommodate this replacement operation.

On first operation of the brakes after replacement of the shoes, the operation of the brake adjuster is the same as described in connection with initial application of the adjuster to the rigging and this effects extension of the adjuster that is necessary to insure the required 7 inch stroke of the brake cylinder.

In the event that a brake shoe, or perhaps two brake shoes become lost, during the next brake cylinder power stroke the operation of parts is the same as described above in connection with normal operation except the differential motion introduced into the slack take up control assembly by the position of the dead lever will move the trigger rod 130 to such a position that at the end of the power stroke the spring assembly 126 will be compressed substantially and on release of the brakes, the resilient contraction of the spring assembly 126 introduces a substantial bias on the nut 101 which insures its rapid rotation in the slack take up direction a sufficient amount to take up slack according to the amount required to compensate for the loss of the brake shoes.

However, when more than two brake shoes are lost, during the power stroke the brake assembly 126 goes solid under the differential movement imposed upon the trigger rod 130 by the dead lever 60; in this position, the edge 510 of the segment 405 of housing 408 will engage disc 426 (this condition, under such circumstances will occur before the nut 101 is separated from seat member 98).

Further movement of the dead lever will thereafter, during the power stroke, apply through rod 130 a direct thrust to the nut device 100 forcing its separation from seat member 98 and biasing it through thrust bearing 102 to rotate rapidly in its slack take up direction as the nut moves with respect to the housing 80 towards seat member 99. After the brake stroke is completed, any relative contraction remaining in the spring assembly 126 will again rotate nut 101 in its slack take up direction the amount required to insure that the brake cylinder 16 has the required 7 inch stroke on the next application of the brakes.

The embodiments of FIGURES 6 and 7 operate in the same manner as would be obvious to those skilled in this art.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

What is claimed is:

1. In an automatic two way slack adjuster adapted to form a part of railroad car brake rigging as a force transmitting device, wherein said adjuster includes a pair of elongate members disposed in juxtaposed parallel relation, one of said members comprising a screw member, a nut screw threadedly carried by said screw member, the other of said members carrying a stop clutch assembly including seats positioned on either side of said nut, resilient means for biasing said members to move in a slack take up direction with respect to each other, which motion biases said nut against one of said seats, let out resilient means acting between said other member and said nut for biasing said nut to rotate said nut to a predetermined position with respect to said one member in a slack let out direction when said nut is in a position intermediate said seats, and take up control means for biasing said nut to rotate in a slack take up direction, said take up control means comprising resiliently flexible actuator means operatively engageable with said nut for biasing same to rotate in said take up direction when said nut is in a position intermediate said seats, said actuator means including means for flexing same in proportion to the slack to be taken up in the rigging and means for applying the resilient restorative forces of said actuator means that oppose said flexing means to apply said bias to said nut to rotate same in said take up direction the amount required to take up the slack in the rigging, the improvement wherein:

the first mentioned resilient means is mounted inside said one elongate member,
and including opposed abutment means mounted inside of said one elongate member,
said spring being interposed between said abutments for providing said biasing action on said members,
one of said abutments being secured to said other member,
and the other of said abutments being secured to said one member,
whereby, the adjuster has maximum slack take up and let out position lengths that are independent of the solid length of said first mentioned resilient means.

2. The improvement set forth in claim 1 wherein:
said elongate members, said first mentioned resilient means, and said abutments are proportioned to provide travel on the order of twenty-four inches between said maximum position lengths of said adjuster.

3. A brake adjuster comprising:
a housing member,
a rod member having a portion thereof received inside said housing member,
said rod member including a tubular screw component,
a nut component threadedly engaging said screw component,
said housing member including a stop clutch assembly defining spaced seats,
one of said components being fixed with respect to said rod member and the other of said components being rotatable with respect to said housing member,
said screw component carrying opposed friction surfaces disposed between said seats and positioned to alternately engage same,
resilient means mounted in said screw component for biasing said members to move in a slack take up direction with respect to each other, which motion biases one of said screw component surfaces against one of said seats,
slack let out resilient means adapted to act between said housing member and said other of said components for biasing the latter to rotate in a slack let out direction,
slack take up resilient means adapted to act on said other of said components for biasing the latter to rotate in a slack take up direction,
and take up and let out control means for controlling the action of said let out and take up resilient means on said other component to rotate same with respect to said housing member in either of said directions,
said control means including actuator means movable with respect to said members between an initial brake stroke position and a position spaced therefrom defining a slack take up position,
means coupled with said actuator means for rendering effective on said other component said let out resilient means when said actuator on a brake stroke is short of said slack take up position to move said other component to the needed slack let out position,
and for rendering effective on said other component said take up resilient means at said second position thereof relative to said housing member to move said other component to its needed slack take up position,
and means for actuating said actuator means to position same in said positions accordance with the slack requirements of the system,
and opposed abutment means positioned inside said screw component, with the first mentioned resilient means being interposed between said abutments,
one of said abutments being secured to said screw component,
and the other of said abutments being secured to said housing member.

4. In a brake adjuster adapted to form a part of a railroad car brake rigging as a force transmitting device, and including a screw member mounted in telescoping relation to a housing member, a nut member threadedly received on said screw member, and means for actuating said nut during operation of the brake rigging to rotate in slack take up and let out directions as required to maintain the stroke of the rigging brake cylinder of substantially uniform length, the improvement wherein:
said screw member includes a tubular portion,
and including compression spring means mounted in said screw member tubular portion for biasing said members to move in a slack take up direction and interposed between spaced abutment means positioned inside said screw member,
one of said abutment means being secured to said screw member,
and the other of said abutment means being secured to said housing member.

5. In a brake adjuster adapted to form a part of a railroad car brake rigging as a force transmitting device, and including a rod member provided with a screw portion at one end thereof and means at the other end thereof for securing same into the rigging, a housing member mounted in telescoping relation to the rod member screw portion at one end thereof and including means at the other end thereof for securing same into the rigging, resilient means for biasing said members for movement in a slack take up direction, a nut threadedly received on said screw portion of said rod members, and means for actuating said nut during operation of the brake rigging to rotate in slack take up and let out directions as required to maintain the stroke of the rigging brake cylinder of substantially uniform length, the improvement wherein:
said rod member includes a tubular portion at said one end thereof,
said resilient means being received in said rod member tubular portion,
said resilient means comprising:
compression spring means,
abutment means secured to said rod member at said one end thereof,
abutment means secured to said housing member and disposed within said rod member tubular portion,
with said compression spring means being interposed between said abutment means for providing said slack take up biasing action.

6. The improvement set forth in claim 5 wherein:
the second mentioned abutment means comprises:
a spring seat member,
and a rod member connecting said spring seat to said housing member,
said spring seat rod member extending through said compression spring means.

7. The improvement set forth in claim 6 wherein:
said housing member is tubular through said one end thereof,
said spring seat rod member extending through said housing member one end being connected to said housing member.

8. In a brake adjuster adapted to form a part of a railroad car brake rigging as a force transmitting device, and including a rod member provided with a screw portion at one end thereof and means at the other end thereof for securing same into the rigging, a housing member mounted in telescoping relation to the rod member screw portion at one end thereof and including means at the other end thereof for securing same into the rigging, resilient means for biasing said members in a slack take up direction, a nut threadedly received on said screw portion of said rod member and within a portion of said housing, said housing portion carrying a stop clutch assembly including spaced seats adapted to be engaged by opposing clutch surfaces of said nut, and means for actuating said nut during operation of the brake rigging to rotate in slack take up and let out directions as required to maintain the stroke of the rigging brake cylinder of substantially uniform length, the improvement wherein:
said rod member includes a tubular portion at said one end thereof,
said resilient means being received in said rod member tubular portion,
said resilient means comprising:
compression spring means,
abutment means secured to said rod members at said one end thereof,
abutment means secured to said housing member and disposed within said rod member tubular portion,
with said compression spring means being interposed between said abutment means for providing said slack take up biasing action,
said nut clutch surfaces and said seats having an angle on the order of 30 degrees with respect to the longitudinal axis of said screw member.

References Cited
UNITED STATES PATENTS

| | | | |
|---|---|---|---|
| 2,973,841 | 3/1961 | McClure et al. | 188—196 |
| 3,096,859 | 7/1963 | Showers et al. | 188—196 |
| 3,177,985 | 4/1965 | Rauglas | 188—196 |

DUANE A. REGER, *Primary Examiner.*